Figure 1:
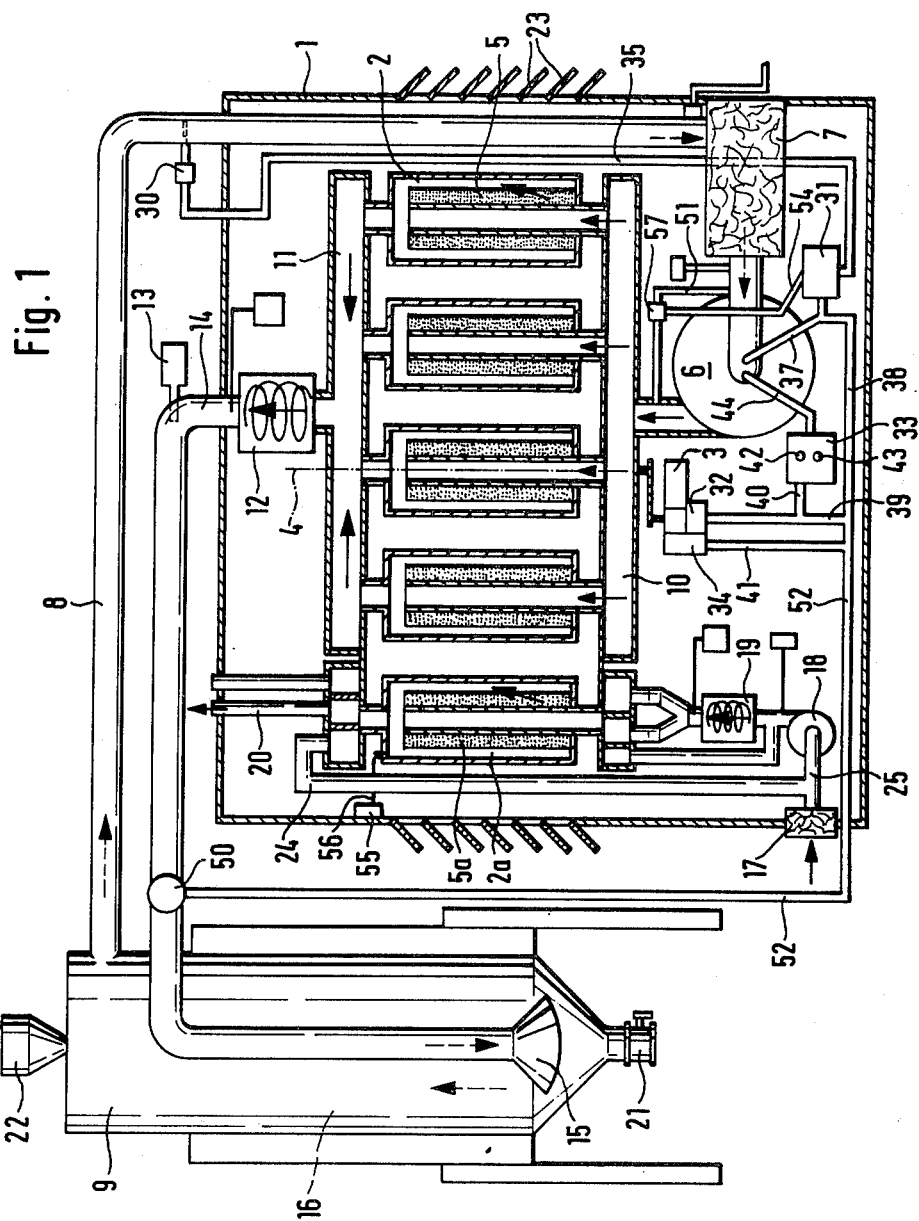

United States Patent [19]

Gräff

[11] 4,413,426
[45] Nov. 8, 1983

[54] METHOD AND APPARATUS FOR DRYING MOIST EXHAUST AIR FROM ONE OR MORE BULK MATERIAL DRYING HOPPERS

[76] Inventor: Roderich W. Gräff, 1311 Pine Valley Ct., Ann Arbor, Mich. 48104

[21] Appl. No.: 326,223

[22] Filed: Dec. 1, 1981

[30] Foreign Application Priority Data

Mar. 20, 1981 [DE] Fed. Rep. of Germany ....... 3110873
Aug. 8, 1981 [DE] Fed. Rep. of Germany ....... 3131471

[51] Int. Cl.³ .............................................. F26B 3/14
[52] U.S. Cl. ........................................ 34/27; 34/32; 34/54; 34/80; 34/169; 55/217; 55/387
[58] Field of Search ............... 34/80, 169, 174, 54, 34/34, 27, 28, 29, 32; 55/217, 179, 387

[56] References Cited

U.S. PATENT DOCUMENTS 3,487,608 1/1970 Graff ...................................... 55/33
3,621,585 11/1971 Robertson ............................. 34/10

FOREIGN PATENT DOCUMENTS 2742297 3/1979 Fed. Rep. of Germany ........ 34/169

*Primary Examiner*—Larry I. Schwartz
*Attorney, Agent, or Firm*—Wood, Herron & Evans

[57] ABSTRACT

The exhaust air from a bulk material drying hopper is conveyed through a chamber filled with an absorbing medium and the air is fed back to the drying hopper in a closed circuit. The chamber is regenerated at intervals in a second circuit. The air throughput through the hopper is controlled as a function of the temperature of the exhaust air.

28 Claims, 2 Drawing Figures

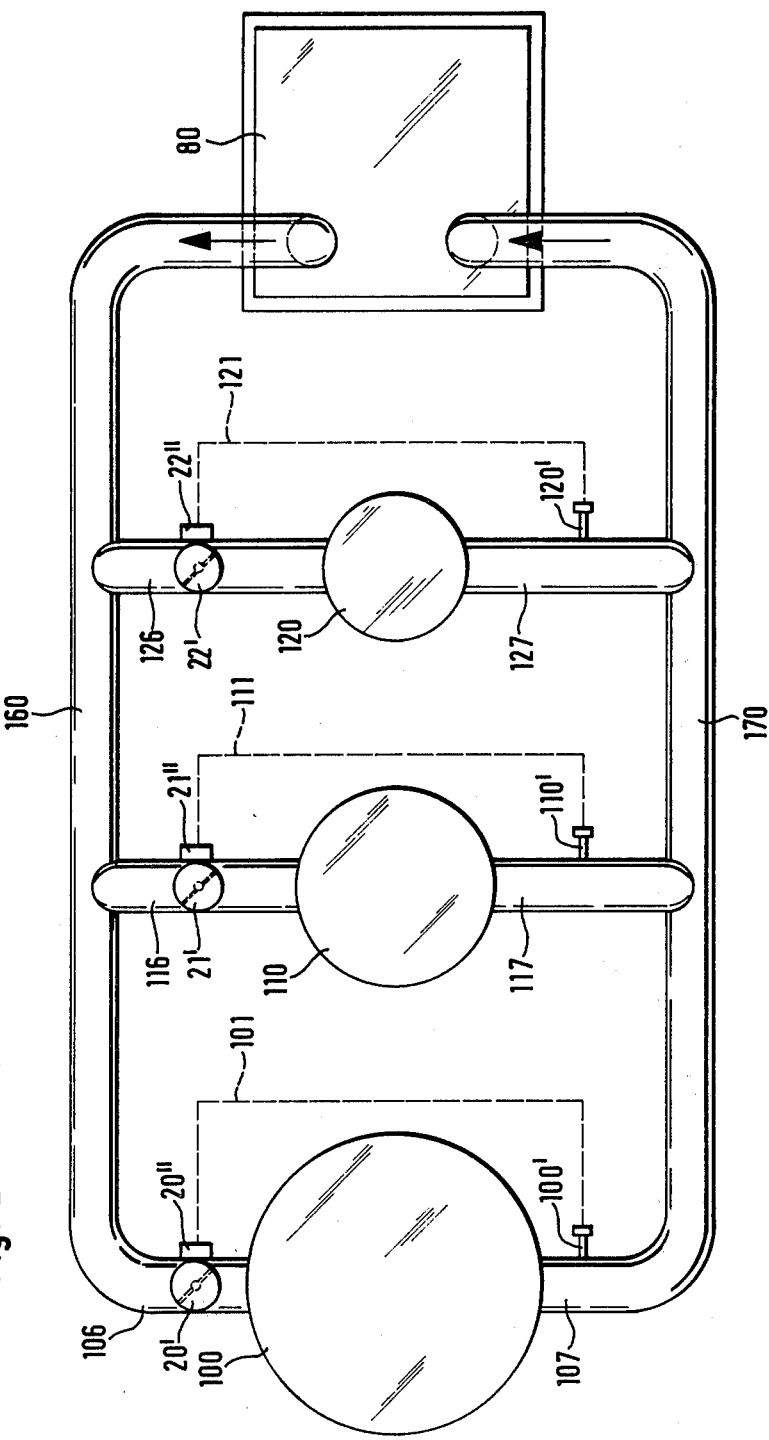

METHOD AND APPARATUS FOR DRYING MOIST EXHAUST AIR FROM ONE OR MORE BULK MATERIAL DRYING HOPPERS

The invention relates to a method of drying exhaust air from at least one bulk material drying hopper, the said exhaust air being conveyed through at least one chamber filled with an absorbing medium and being fed back to the drying hopper or hoppers in a closed circuit, wherein the chambers are regenerated at intervals in a second air circuit, and to an apparatus which is particularly suited to carrying out the method.

In order to dry bulk materials of all types, in particular plastics powders and granulates, in the bulk material drying hopper, hot dry drying air is blown into the drying hopper through the supply air pipe opening in the lower portion of the drying hopper, flows counter to the bulk material sinking through the drying hopper, heats the said bulk material, absorbs moisture therefrom while cooling and leaves the drying hopper at its upper portion through the exhaust air pipe. The damp exhaust air is then conveyed through a chamber filled with an absorbing medium and arranged in a drier and is forced through a heating device into the supply air pipe again by the blower.

If the quantity of bulk material sinking through the drying hopper from the top to the bottom per unit of time is reduced, the temperature of the exhaust air rises. This effect can lead to the exhaust air leaving the drying hopper so hot that is enters the chamber at a relatively high temperature. The silica gel or molecular sieve, usually employed as the absorbing medium for the moisture, has the characteristic, however, that its moisture absorption is sharply reduced at a higher temperature. Exhaust air at a temperature above 40° C. to 60° C. is then no longer completely dried in the chamber, and on entering the drying hopper the supply air already contains water vapour and thus has a poorer condensation point. In this way the drying process in the drying hopper takes place more slowly or incompletely. In addition the temperature in the dry air drier rises to an undesired extent, which, particularly in the case of a closed drier housing, is harmful to the units disposed therein. Finally, the higher return air temperature causes increased energy losses from the air pipes and the drier into the operating area.

The invention is thus to provide measures which prevent deleterious heating of the dry air drier, make possible a good condensation point of the drying air even with a reduced granulate throughput and reduce the energy losses occurring in the entire system from air pipes, driers and bulk material drying hopper or hoppers.

To this end the method named above is effected according to the invention such that the amount of the air throughput through the bulk material drying hopper is controlled as a function of the air temperature. In contrast to the conventional idea that as great a quantity of drying air as possible is advantageous for the success of the drying, the quantity of drying air is throttled as the exhaust air temperature rises, to the extent that the temperature of the exhaust air remains scarcely above room temperature. This results in complete drying of the exhaust air in the chamber, avoids injurious heating of the drier and reduces the energy losses. Furthermore the invention allows the heat contained in a chamber which has just been regenerated to be used for preheating the supply air. Thus according to the invention a chamber which has just been regenerated need not be separately cooled before being brought into the drying air circuit. This was always necessary before, since bringing an uncooled chamber into the drying air circuit at a high temperature of the exhaust air would result in a injuriously high rise in the supply air temperature.

If two or more drying hoppers are present, when they are connected in parallel it is often difficult to distribute the quantity of air correctly to the individual drying hoppers on account of, inter alia, the different distances of the drying hoppers from the drier and also the different sizes of the drying hoppers. This distribution is also made difficult by the fact that widely differing materials, which in addition present an entirely different resistance to the air flowing through the drying hopper, has to be dried in the individual drying hoppers.

Even if it is possible to distribute the entire quantity of air which may be delivered by a drier correctly to the individual drying hoppers, for example by manual adjustment of throttle valves provided in the supply pipes to the individual drying hoppers, the equilibrium once attained is considerably impaired by the fact that unexpectedly more granulate mass is removed from a drying hopper than was intended. If, however, more or less drying air than is required by the drying process taking place in a drying hopper is supplied to the said drying hopper, the phenomena described above occur.

In a further development of the invention, a deleterious heating of the drying air drier is prevented and a good condensation point of the drying air is made possible even with a reduced granulate throughput through one of the drying hoppers, when the quantity of the drying air flowing through each bulk material drying hopper is regulated as a function of its emergent temperature from the respective drying hopper. In this way even a multi-drying-hopper system may be combined with the drier without energy losses or injurious heating of the said drier.

The invention also provides an apparatus for drying damp exhaust air supplied from a bulk material drying hopper by way of an exhaust air pipe, comprising at least one chamber filled with an absorbing medium, a regeneration device for the chamber and a blower, the pressure side of which is connected to a supply air pipe leading into the drying hopper and provided with a heating device, a temperature sensor influencing a control device being arranged in the exhaust air pipe. This apparatus allows the method according to the invention to be carried out in a particularly simple manner. The control device can control either a throttle arranged in the supply air pipe, a by-pass pipe connecting the pressure side to the inlet side of the blower or the drive of the blower in the sense of an alteration of the air throughput controlled by the exhaust air temperature.

If, in a further development of the invention, the control device is connected to a device determining the regeneration frequency of the chambers in the regeneration device, the regeneration frequency of the chambers may be reduced in the same ratio as the reduction of the quantity of air flowing through the drying hopper. This represents a major saving in energy, since in the case of dry air driers the regeneration process has a relatively high energy requirement. By this additional use of the control device the use of expensive moisture sensors, by means of which the regeneration frequency is controlled, is dispensed with. Alternatively the further development of the invention provides for a manually operable control device for controlling the air throughput through the supply air pipe. In this way the dry air drier according to the invention becomes extremely economical and efficient, as the amount of the dry air throughput may be adjusted according to the quantity of the bulk material present which is to be dried and its moisture content with reference to predetermined guidelines. An additional energy saving is obtained by combining the volume control of the dry air with a manually adjustable regeneration frequency.

Finally, the invention may also be realized by connecting the control device to a device determining the transition rate from the regeneration phase to the drying phase on the regeneration device. If the quantity of dry air is throttled, a newly regenerated uncooled chamber may be brought into the dry air circuit substantially more slowly than in the case of a higher dry air throughput. The control device may also contain a delaying element which effects a reduction of the dry air throughput through the supply air pipe with a delay when bringing a newly regenerated, hot chamber into the drying phase.

A particularly advantageous further development of the invention, in the case of the apparatus, provides that when a plurality of bulk material drying hoppers are arranged in parallel a temperature sensor influencing the control device is disposed in each air pipe of a bulk material drying hopper, it also being particularly recommended that a temperature sensor controlling a motor-driven throttle valve by way of a separate control line should be arranged in the air pipe leading to each drying hopper.

In addition, advantageous further developments of the invention are set out in the sub-claims.

The invention is explained in detail below with reference to the embodiments illustrated in the accompanying drawings, in which FIG. 1 is a diagrammatic cross-sectional view of a bulk material drying hopper with a drier, and FIG. 2 is a plan view of an arrangement of a plurality of bulk material drying hoppers connected in parallel to a drier in accordance with FIG. 1.

In a housing 1 of a dry air drier five chambers 2 are arranged on a rotating frame which is slowly rotated by a drive motor 3 about its axis 4. The chambers are filled with an absorbing medium 5. A blower 6 sucks air via a filter 7 from an exhaust air pipe 8 which is connected to a bulk material drying hopper 9, and forces it via a distributing duct 10 through four of the five chambers 2 filled with the absorbing medium 5. The drying air flows from these chambers via a collecting duct 11 through a heater 12 which is adjusted to the desired preheating temperature of the emergent drying air by a thermostat 13, and via a supply air pipe 14 to the drying hopper 9. The supply air pipe 14 opens into an air distributor 15 which extends deep into the drying hopper 9. The dry preheated drying air now slowly rises up through the plastics granulate 16, absorbs the moisture of the latter and gives off part of its heat. The cycle then begins again via the exhaust air pipe 8 and the filter 7.

Of the five chambers 2 the chamber 2a shown on the left in the drawing is connected in a regeneration circuit which is completely separate from the circuit of the drying air and in which a further filter 17, a blower 18 and a heater 19 are arranged. The blower 18 draws in outside air via the filter 17 and forces it via the heater 19 through the absorbing medium 5a saturated with moisture into the chamber 2a. The heated air absorbs the moisture of the absorbing medium 5a in the chamber 2a and escapes into the atmosphere via the tube 20.

As soon as the regeneration process of the absorbing medium, i.e. the removal of the moisture, is completed, the newly regenerated chamber 2a is rotated into the dry air circuit by the motor 3 and is available for drying air, while an adjacent chamber heavily saturated with moisture is rotated into the regeneration circuit. The quantity of dried granulated material 16 removed at the removal box 21 of the drying hopper 9 is continuously replaced by damp granulated material from the conveying means 22.

The temperature-sensitive element of a temperature sensor 30 extends into the exhaust air pipe 8 and detects the temperature of the exhaust air from the drying hopper 9. The temperature sensor 30 is connected to an input of a control device 31 by way of an output line 35 and transmits a signal corresponding to the detected temperature of the exhaust air to the control device 31. The control device 31 compares the detected temperature of the exhaust air with a nominal value which corresponds, for example, to a temperature slightly above room temperature. If the temperature registered by the temperature sensor 30 is above the reference value, the control device 31 acts upon the drive of the blower 6 by way of a line 37 in such a way that the blower 6 forces a reduced amount of air through the chambers and the supply air pipe 14 into the drying hopper 9. This throttling of the amount of supply air fed in may be effected in a manner not shown either by reducing the rotational speed of the blower 6 or by opening a feedback pipe 51 from the delivery side of the blower 6 to its suction side and allowing an appropriate proportion of the quantity of dry air to flow back.

In addition a branch line 52 leads from the control line 38 to a throttle 50 in the supply air pipe 40 so that a control signal emitted by the control device 31 can control the throttle 50 as a function of the exhaust air temperature detected by the temperature sensor 30.

A branch line 38 and 39 from the line 37 leads to a device 32 which determines the regeneration frequency of the chambers by accelerating or retarding the motor 3 of the rotating means. If the blower 6 is controlled by the control device so as to reduce the amount of air supplied, therefore, the regeneration frequency is reduced by the device 32 in order to utilize to the full the moisture-absorption capacity of the absorbing medium 5 in the chambers 2 and thus to save energy.

In addition, the drive motor 3 is controlled by a device 34 which allows the transition rate from the regeneration phase to the drying phase of a fully regenerated chamber 2a to be prolonged if the quantity of supply air moved by the blower 6 is reduced. To this end the branch line 38 leads from the control device 31 via a line 41 to the device 34.

The line 39, which leads from the branch line 38 to the device 32, may also be acted upon by a signal from a control device 33 via the line 40 when one of the manually operable adjustment knobs 42 is set so as to prolong the regeneration cycle period in accordance with a predetermined tabular value. The tabular value takes into consideration the nature of the plastics granulated material contained in the drying hopper 9, the hourly throughput through the drying hopper and its moisture content. A further adjustment knob 43 on the control device 33, which allows the drive of the blower 6 to be directly acted upon by a control signal via a line 44, allows the quantity of supply air conveyed by the blower 6 to be controlled independently of the regeneration cycle period. In addition, the control device 31 contains a delay element, not shown, which allows a control signal increasing the amount of air conveyed through the blower 6 to reach the line 37 with a delay when a newly regenerated hot chamber 2a is rotated into the drying phase by the motor 3.

The invention may also be applied in the same way with a closed housing 1 for the dry air drier. In the case of a closed dry air drier the ventilation grille 23 and the connecting line 25 to the filter are dispensed with. Instead, the quantity of air required for the regeneration cycle is sucked in by the blower 18 under the cover of the housing 1. In addition, suction lines are run from the filter 17 to the motor 3 (and) to the blower 6, which are cooled by the outside air sucked in.

A position sensor 55, the sensor 56 of which is contacted by a regenerated chamber 2a during its advance through the regeneration phase, is also secured in the housing 1 in the path of the chamber 2a. The position sensor 55 controls, in a manner not shown, the drive motor 3 for the rotating frame with the chambers 2, 2a and the other chambers not provided with reference numerals. In this way, before bringing a regenerated chamber into the drying phase, the rotating frame is detained until the chamber which has remained in the drying phase the longest is sufficiently saturated. The frequency with which the air throughput through the drying hopper would be throttled by the sensor 30 and the control device 31 may be taken as a criterion for the moisture absorbed in a chamber.

It is also within the scope of the invention to arrange the temperature sensor 30 in the supply air pipe 14, preferably downstream of the throttle 50, in order to obtain an indirect reading of the exhaust air temperature in this way.

According to FIG. 2 bulk material drying hoppers 100, 110, 120 with different filling quantities of from 1,000 liters to 200 liters are connected in parallel to a drier 80 of the type illustrated in FIG. 1 via a supply air pipe 160 and an exhaust air pipe 170. From the supply air pipe 160 a portion 106 leads to the drying hopper 100, a supply air branch pipe 116 leads to the drying hopper 110 and a supply air branch pipe 126 leads to the drying hopper 120. From the drying hopper 100 a portion 107 leads to the exhaust air pipe 170, and from the drying hopper 110 a branch exhaust air pipe 117 and from the drying hopper (120) a branch exhaust air pipe 127 respectively lead to the exhaust air pipe 170.

Directly in front of the inlet to each of the drying hoppers 100, 110, 120 a throttle valve 20', 21', 22' is disposed in the pipes 106, 116, 126 respectively, the position of the said throttle valves in the cross-section of the associated supply air pipe being controlled by a setting motor 20'', 21'', 22'' respectively. From each of the setting motors 20'', 21'', 22'' respectively a separate control line 101, 111, 121 leads to a temperature sensor 100', 110', 120' respectively, which is arranged in the other air pipe 107, 117, 127 leading to the associated bulk material drying hopper 100, 110, 120 respectively. Each of the temperature sensors 100', 110', 120' delivers a setting signal via the associated control line 101, 111, 121 to the setting motor 20'', 21'', 22'' respectively connected to the associated control line, and this signal causes the said setting motor to move the throttle valve 20', 21', 22' into a corresponding position in accordance with a characteristic magnitude of the control signal. If, for example, the exhaust air from the bulk material drying hopper 100 is too hot, the throttle valve 20' is closed again by the setting motor 20''.

It is also within the scope of the invention for each of the throttle valves 20', 21', 22' also to be manually adjustable to a selected initial position. Finally, the invention may also be realized by the control lines 101, 111, 121 being led separately to a microprocessor, not shown, which is disposed for example in the control device 31 of the drier 80 and which, where necessary while evaluating further measurement values taken from the bulk material drying hoppers 100, 110, 120, allows the control signals delivered by the temperature sensors 100', 110', 120' to produce control signals individually to the respective setting motors 20'', 21'', 22'' via control lines not shown. In this way a central control of the volume of air throughput both through each of and through all the bulk material drying hoppers 100, 110, 120 is possible, so that this interpretation of the invention produces a particularly sensitive adjustment of the air throughput to the respective operating phases and conditions of the individual bulk material drying hoppers 100, 110, 120. In addition, it is within the scope of the invention to arrange the temperature sensor in the exhaust air branch pipe and the motor-controlled throttle valve in the supply air branch pipe on the one hand and the temperature sensor in the supply air branch pipe and the throttle valve in the exhaust air branch pipe on the other.

In the above description and in the claims the term "air" also embraces ordinary gases, such as nitrogen, the use of which is recommended in many cases according to the granulated material to be dried and/or the dry mass in the drier.

I claim:

1. In a method of drying exhaust air from one or more bulk material drying hoppers, comprising the steps of conveying exhaust air from a bulk material drying hopper through at least one chamber filled with an absorbing medium and feeding the air back to the drying hopper in a closed circuit, the chamber being regenerated at intervals in a second air circuit, the improvement comprising the step of controlling the amount of the air throughput through the bulk material drying hopper as a function of the temperature of the exhaust air from the drying hopper.

2. The method of claim 1, in which the volume of the air throughput is controlled by altering the rotational speed of a blower connected to the chamber.

3. The method of claim 1, in which the volume of the air throughput is controlled by a throttle arranged in an air pipe for the drying hopper.

4. The method of claim 1, in which the volume of the air throughput is controlled by opening and closing a by-pass pipe of a blower connected to the chamber.

5. The method of claim 1, in which at least two bulk material drying hoppers are in parallel and the quantity of the drying air flowing through each bulk material drying hopper is regulated as a function of its emergent temperature from the respective bulk material drying hopper.

6. The method of claim 1, in which a newly regenerated chamber in the uncooled state is transferred to the drying phase.

7. The method of claim 6, in which directly before bringing a hot regenerated chamber into the drying circuit the quantity of air is throttled in accordance with the temperature of the exhaust air.

8. In apparatus for drying moist exhaust air supplied from one or more bulk material drying hoppers by way of an exhaust air pipe, comprising at least one chamber filled with an absorbing medium, a regeneration device for the chamber, and a blower whose pressure side is connected to a supply air pipe leading into the drying hopper and provided with a heating device, the improvement comprising temperature sensing means disposed in an exhaust air pipe leading from the drier and a control means operably connected to the temperature sensing means for controlling the amount of air supplied to the drying hoppers as a function of the temperature of exhaust air in said exhaust pipe.

9. The improvement of claim 8, in which the control means is operably connected to means for driving the blower for controlling blower speed as a function of said exhaust air temperature.

10. The improvement of claim 8, in which said control means is operably connected to means for determining the regeneration frequency of the chamber.

11. The improvement of claim 8, including a manually operable means for controlling the air throughput through the air pipe.

12. The improvement of claim 8, including a second manually operable control means for controlling the regeneration frequency of the chamber.

13. The improvement of claim 8, in which the control means is connected to a means for determining the transfer speed of a newly regenerated hot chamber into the drying circuit.

14. The improvement of claim 8, in which the control means includes a delaying element which effects a reduction of the air throughput through the air pipe with a delay when bringing a newly regenerated, hot chamber into the drying phase.

15. The improvement of claim 13 or 14, including a rotating frame comprising a plurality of the chambers, each of which is selectively connected to said drying hoppers for drying air and disconnected therefrom for regeneration, position sensor means operably connected to said rotating frame, and a delaying element controlled by the position sensor, for temporarily reducing the drive speed of the rotating frame.

16. The improvement of claim 8, including a closed housing accommodating the control device and the blower.

17. The improvement of claim 8, including a plurality of bulk material drying hoppers arranged in parallel, a temperature means influencing the control means being arranged in each air pipe of a bulk material drying hopper.

18. The improvement of claim 8, including a plurality of bulk material drying hoppers arranged in parallel, the temperature sensing means operably connected to and controlling a motor-controlled throttle valve by way of a separate control line disposed in the exhaust air pipe of each bulk material drying hopper.

19. In apparatus for drying moist exhaust air supplied from one or more bulk material drying hoppers by way of an exhaust air pipe, and for returning dried air to said hoppers, wherein said apparatus includes at least one air drying chamber filled with a moisture absorbing medium, a regeneration apparatus for the chamber and a blower means for moving air through the hopper and drying chamber, the improvement comprising:
temperature sensing means disposed in said exhaust air pipe for sensing temperature of said moist exhaust air, and
control means operably connected to said temperature sensing means for varying the amount of dried air supplied from said drying chamber to said hopper in response to changes in the sensed temperature of said moist exhaust air.

20. The improvement of claim 19, wherein said control means is operably connected to said blower means for varying the amount of air supplied to said hopper.

21. The improvement of claim 19, further including a plurality of drying chambers and second control means for controlling the regeneration frequency of said chambers as a function of the change in temperature of said exhaust air.

22. The improvement of claim 19, further including manual control means for controlling the amount of air supplied to said hopper.

23. The improvement of claim 19, further including a plurality of drying chambers and a manual control means for controlling the regeneration frequency of each chamber.

24. The improvement of claim 19, further including a plurality of drying chambers, means for selectively removing a chamber from a dry air supply circuit to said hopper for regeneration and means for controlling the transfer speed of a regenerated drying chamber into the supply circuit.

25. The improvement of claim 19, including a plurality of drying chambers, means for selectively removing a drying chamber from an air supply circuit to said hopper for regeneration and for reintroducing the regenerated chamber to said circuit and delay means for reducing the amount of dry air supplied to said hopper when reintroducing a newly regenerated chamber into said supply circuit.

26. The improvement of claim 19, including a plurality of drying chambers mounted on a rotating frame for rotation out of a dry air supply circuit for said hopper for regeneration and reintroduction thereto after regeneration, a chamber position sensor and delay means operably connected to said rotating frame for varying the speed of said frame and the reintroduction of chambers to said supply circuit.

27. The improvement of claim 19, including a plurality of bulk material drying hoppers disposed in a parallel air circuit, each hopper having an exhaust passage and hopper exhaust air temperature sensing means disposed in each exhaust passage.

28. The improvement of claim 27, including a dry air supply duct supplying each hopper, a throttle valve means disposed in each supply duct and said valve means for each hopper operably connected to the temperature sensing means of each hopper for varying the amount of drying air supplied to its respective hopper in response to variations in temperature of the exhaust air of the respective hopper.

* * * * *